United States Patent

Frohlund

[19]

[11] Patent Number: 6,091,964
[45] Date of Patent: Jul. 18, 2000

[54] PORTABLE SPEECH COMMUNICATION APPARATUS WITH SOUND CHANNEL IN SWINGABLE FLIP

[75] Inventor: Stig Frohlund, Hässleholm, Sweden

[73] Assignee: Telefonaktiebolaget LM Ericsson, Stockholm, Sweden

[21] Appl. No.: 09/034,260

[22] Filed: Mar. 4, 1998

[30] Foreign Application Priority Data

Mar. 6, 1997 [SE] Sweden .................................. 9700790

[51] Int. Cl.[7] ...................................................... H04Q 7/32
[52] U.S. Cl. ......................... 455/550; 455/90; 455/350; 455/575; 379/428
[58] Field of Search ............................ 455/575, 90, 550, 455/350; 379/433, 434, 428; D14/137, 138

[56] References Cited

U.S. PATENT DOCUMENTS

| | | | |
|---|---|---|---|
| 5,732,331 | 3/1998 | Harms | 455/90 |
| 5,751,804 | 5/1998 | Mendolia | 379/433 |
| 5,832,079 | 11/1998 | Rabe | 379/433 |
| 5,890,072 | 3/1999 | Rabe | 455/550 |
| 5,915,015 | 6/1999 | Thornton | 379/433 |
| 5,963,640 | 10/1999 | Rabe | 379/433 |

FOREIGN PATENT DOCUMENTS 0 275 996   7/1988   European Pat. Off. .

*Primary Examiner*—Dwayne D. Bost
*Assistant Examiner*—Temica M. Davis
*Attorney, Agent, or Firm*—Burns, Doane, Swecker & Mathis, L.L.P.

[57] ABSTRACT

A portable speech communication apparatus, preferably a radio telephone, has a flip (14) which is swingable from the apparatus (10). A sound channel is arranged in the flip for guiding sound from at least one speech opening (54, 62) in the flip to a microphone (24) located in the apparatus. The sound channel is formed as a recess (52) in a plate means (50, 60), which is arranged on an essentially even inside (40) of the flip (14).

5 Claims, 2 Drawing Sheets

PORTABLE SPEECH COMMUNICATION APPARATUS WITH SOUND CHANNEL IN SWINGABLE FLIP

TECHNICAL FIELD

The present invention relates to a portable apparatus for speech communication, the apparatus being provided with a flip swingable from the apparatus, wherein a sound channel is arranged to guide sound from at least one speech opening in the flip to a microphone located in the apparatus.

DESCRIPTION OF THE PRIOR ART

Common examples of portable speech communication devices according to the above are radio telephones or mobile telephones. To be able to operate as intended, such a telephone will obviously require some type of microphone or other electro-acoustical transducer for receiving speech from the user and converting it into electrical signals. Traditionally the microphone has often been located inside the apparatus housing of the telephone, preferably in the lower portion of the telephone, which is located proximate to the mouth of the user. It may easily be realized that the microphone should be located as close to the mouth as possible, in order to better eliminate disturbing influences from the environment, for instance in the form of noise. In correspondence with the technical development within electronics the mobile telephones have become smaller and smaller, and it is not unusual today to have a mobile telephone, which may easily be kept in the palm of the hand. Mobile telephones, which are so small or compact, that their longitudinal size is smaller than the distance between the ear and the mouth of the user, experience a problem in maintaining a short distance between the microphone and the mouth.

One solution to this problem is to provide the telephone with a flip, which is swingable from the apparatus housing, and to place the microphone at a short end of the flip. This solution requires an electrical connection between the microphone located at the end of the flip and the other electrical components, which are located inside the apparatus housing, preferably mounted on a circuit board. Such connection may be achieved by means of electrical wirings. However, the solution has several drawbacks, for instance that the exposed or unprotected location of the microphone at the end of the flip makes it prone to damages caused by external influence. Additionally, it is difficult to provide a sufficiently protected wiring between the microphone and the circuit board, since the wires must in some way pass through a hinge mechanism for mounting the flip to the apparatus housing.

Another solution to the problem is suggested in EP-B-0 275 996, which relates to a telephone with a flip according to the above, wherein the microphone is arranged inside the apparatus housing in close proximity of the hinge mechanism of the flip and wherein a sound channel is arranged inside the flip. This sound channel is connected at a first end to a speech opening in the flip and is connected at a second end to the microphone via a passage through the hinge mechanism. The sound channel is formed in a base portion of the flip as a slotted cut with increasing width. An upper portion of the flip covers the cut as well as surrounding areas of the base portion, an air column thereby being formed, in which sound may be propagated from the speech opening to the microphone.

The disadvantage of such an arrangement is the large difficulties experienced when trying to provide an air-tight seal between the base portion and the upper portion. Insufficiencies in this seal will cause losses of energy in the acoustical signal received by the microphone. In order to compensate for such losses the signal may be amplified by electrical means, but this will, unfortunately, imply a bigger tendency of noise reception and acoustic feedback and therefore also a deteriorated signal-to-noise ratio, which naturally should be avoided in an apparatus for speech communication. The geometrical shape of the sound channel is carefully acoustically adapted to the actual telephone model, wherein tools used in the manufacturing process for moulding of plastics or the like have to be adapted to the actual shape of the sound channel. If these tools are to be used later for a different telephone model, they will have to be modified, which implies high production costs, relatively speaking. Furthermore, a slotted cut as described above will often also give rise to cosmetic defects on the outside of the flip, since the material thickness is smaller along the extension of the cut, thereby revealing a difference fully visible to the human eye, when the flip is examined from certain angles.

SUMMARY OF THE INVENTION

The object of the present invention is to provide a sound channel in a speech communication apparatus with a flip according to the above, wherein the problems described above are solved or reduced. In particular, the object is to allow reduced costs for the manufacturing of the flip as well as providing the sound channel with an improved seal to the environment and additionally avoid the risk of having cosmetical defects on the flip.

The objects above are achieved, according to the present invention, for a portable speech communication apparatus as described above by forming the sound channel as a recess in a plate means, which is arranged on an essentially even inside of the flip. According to a preferred embodiment the plate means is attached to the inside of the flip by adhesive means. In this embodiment the plate means consists of two layers, the first of which is a self-adhesive tape, in which the sound channel is formed by cutting out a two-dimensional geometrical form from the tape, and the second of which is a plate, which fully covers the tape and which is provided with aforesaid speech openings.

Other objects, aspects and features of the present invention appear from the subsequent description, patent claims and drawings.

BRIEF DESCRIPTION OF THE DRAWINGS

The invention will be described in more detail in the following, reference being made to the accompanying drawings, in which.

DETAILED DISCLOSURE OF THE INVENTION

Figure 1:
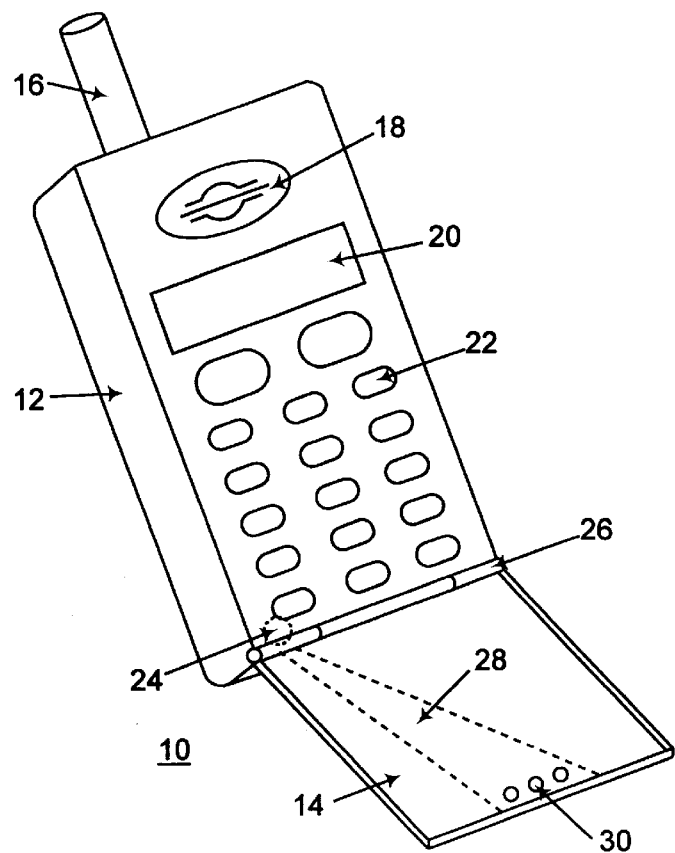
FIG. 1 is a schematic view of a portable apparatus with a flip for speech communication.

In FIG. 1 a mobile telephone 10 is illustrated for exemplary purposes. The telephone is provided with a flip 14 of conventional design, as described above. Furthermore, the mobile telephone 10 comprises an antenna 16, a loudspeaker 18, a display 20, and a set of keys 22, all of which are arranged in an apparatus housing 12. The flip 14 is hinged to the apparatus housing 12 by means of a hinge mechanism 26. The flip 14 is swingable, through this hinge mechanism, from the apparatus housing 12 of the mobile telephone 10. When the telephone is not being used for a call, the flip 14 is preferably folded up against the apparatus housing 12 and covers the set of keys 22 in this position. When the telephone is to be used for a call, the user folds down the flip 14, so that it takes on a position according to FIG. 1.

Additionally, a microphone 24 is arranged inside the apparatus housing at the lower end thereof and in close proximity of the hinge mechanism 26. The flip 14 is provided on its inside with speech openings 30 as well as an internal sound channel 28, which guides spoken sounds from the user and the speech openings 30 to the microphone 24 through a passage in the hinge mechanism 26. The sound channel 28 is formed as a slotted cut in the internal parts of the flip 14.

Figure 2:
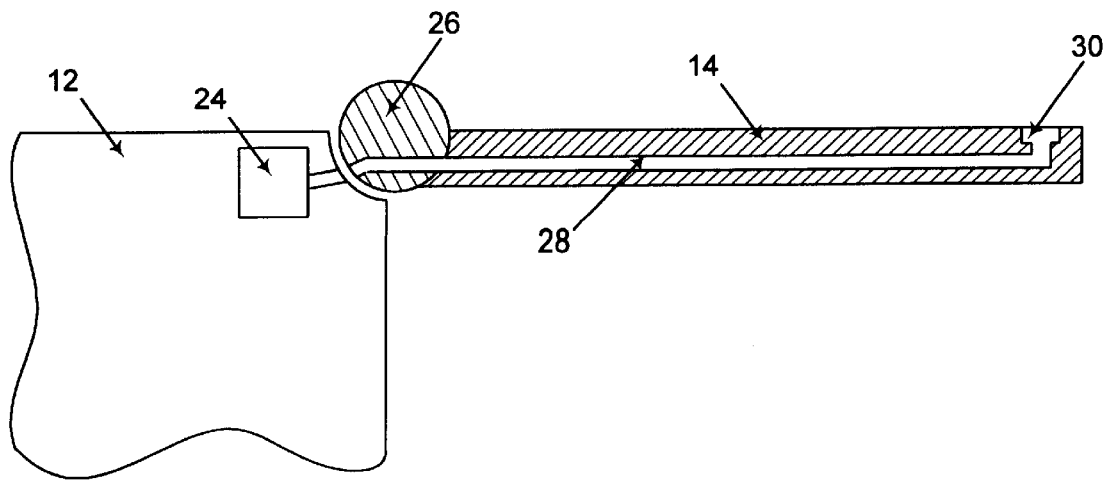
FIG. 2 is a schematic sectional view of a sound channel arrangement in a prior art flip.

The situation is illustrated more clearly in FIG. 2, which in a sectional view shows an enlarged portion of the mobile telephone 10, namely the flip 14, the hinge mechanism 26 as well as the lower portion of the apparatus housing 12. It appears from the drawing how the sound channel 28 is internally formed inside the flip 14. At a first end the sound channel 28 is connected to the speech openings 30. At a second end thereof the sound channel runs through a passage in the hinge mechanism 26 to the microphone 24, which is internally located in the apparatus housing 12.

Figure 3:
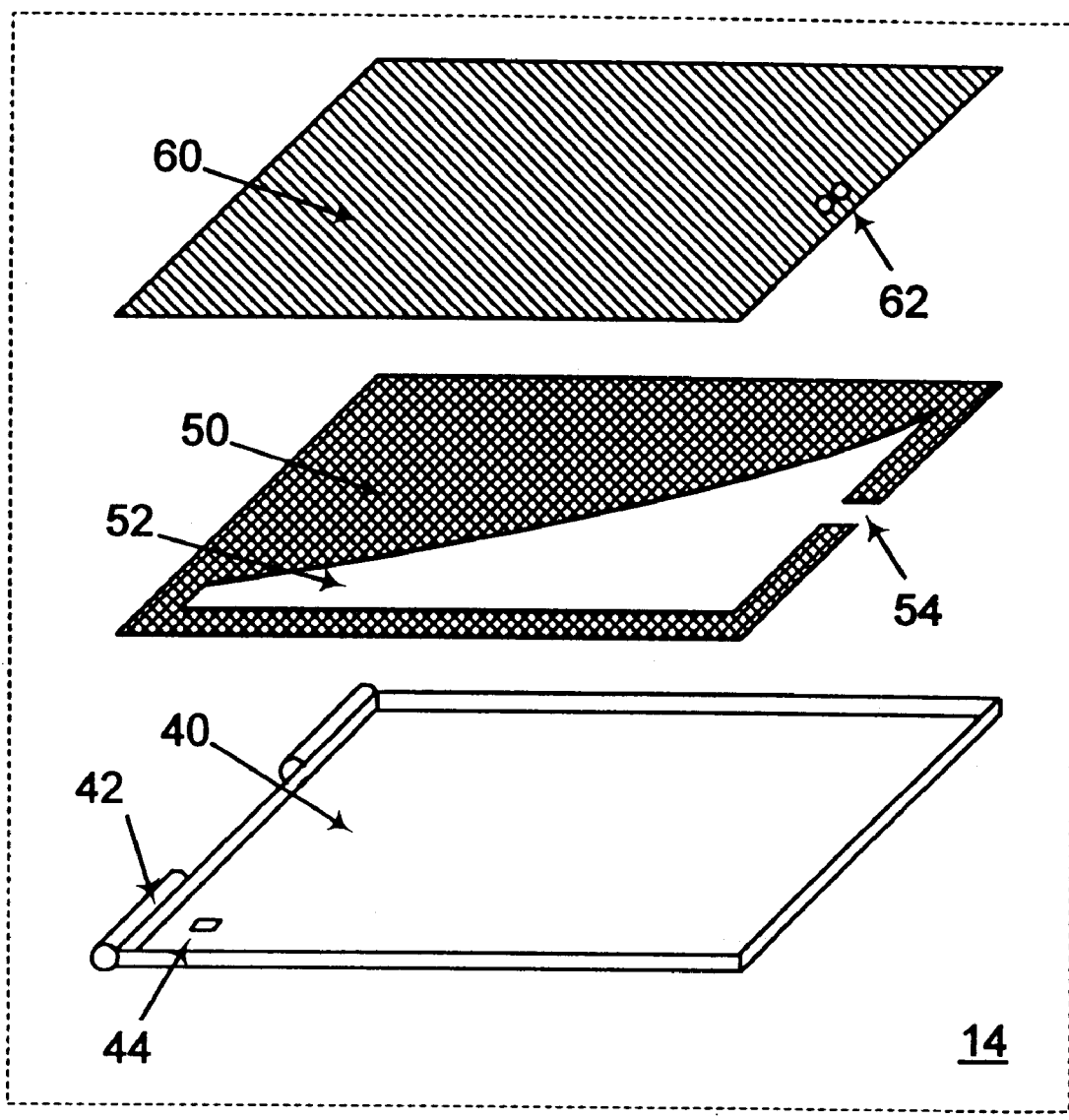
FIG. 3 illustrates a preferred embodiment of a flip provided with a sound channel according to the invention.

FIG. 3 illustrates a flip 14 according to a preferred embodiment of the invention. The flip 14 has a base portion 40 with hinge elements 42 and an essentially even inside, which is surrounded by a low edge or border. Proximate to the hinge elements 42 the base portion 40 is provided with an opening 44, which is arranged to connect the sound channel described below to the microphone located inside the apparatus housing of the telephone.

According to the invention the sound channel is formed by way of a plate-shaped insert means, which in a suitable way is mounted to the even inside of the base portion 40 of the flip 14. In the preferred embodiment according to FIG. 3 this plate means is formed in two layers, the first of which is a self-adhesive tape 50 of plastics or another similar material. The second layer is constituted by an essentially homogeneous plate 60, the peripheral lines of which correspond to the peripheral lines of the tape 50 as well as the base portion 40. The sound channel 52 is formed by cutting out a part of the tape 50. The cut-out part 52 has a two-dimensional geometrical form, which is acoustically appropriate for the application. The cut-out part 52 in FIG. 3 is essentially shaped as a triangle, the hypotenuse of which is bent along an approximate exponential curve. Such an exponentially increasing sound channel area is preferred from an acoustical point of view, since the energy losses are minimized during the propagation of sound through such a channel. However, other geometrical shapes are possible, for instance a strictly triangular shape or a more complicated shape, which will compensate for undesired acoustical phenomena (such as resonance) at certain frequencies. At one short side the tape 50 is cut in two portions for forming an intermediate opening 54. This opening 54 corresponds to a plurality of speech openings 62 in the plate 60 (two speech openings are illustrated in FIG. 3).

The embodiment of FIG. 3 has the great advantage in that the plate-shaped flip insert means forming the sound channel may be produced in advance by attaching the plate 60 to the tape 50. The tape 50 is preferably self-adhesive for allowing simple mounting to the underside of the cover plate 60. Also the underside of the tape 50 is preferably made adhesive, wherein the plate-shaped insert means, 50, 60 may easily be mounted to the even inside of the base portion 40 of the flip 14. The narrowing end of the sound channel 52 corresponds to the opening 44 in the base portion 40. Suitable means are arranged proximate to the opening 44 for connection to the microphone, which is not illustrated in the drawing and which is located inside the apparatus housing of the telephone proximate to the hinge mechanism of the flip, in similarity with the previous drawings. The connection between the opening 44 and the microphone 24 may for instance be achieved by means of a passage in the internal parts of the flip, the passage running through the hinge element 42 to the microphone. Alternatively, an external sound guide may be arranged on the outside of the base portion 40 between the opening 44 and the microphone.

The following advantages are achieved from a design according to FIG. 3:

The production of the flip 14 is made easier, since the insert elements 50, 60 thereof may be manufactured in a separate process and may subsequently be easily mounted to the inside of the base portion 40 of the flip 14.

The flip as suggested by the present invention may be used in many different telephone models. The only thing one will have to do is to adapt the geometrical shape of the sound channel 52 depending on the actual acoustical situation.

Since the insert means forming the sound channel consists of two layers 50, 60, which are joined by adhesion, an excellent seal to the environment is obtained, wherein the reception of noise is minimized.

The flip 14 may be produced less expensive as well a s without cosmetical defects, since the external surfaces of the flip 14 (i.e., the cover plate 60 and the base portion 40 ) are entirely even.

The invention has been described above in the form of a preferred embodiment, but it is to be noticed that the invention is applicable also to other embodiments not shown herein. Hence, the scope of the present invention is only to be limited by the definitions in the appended patent claims.

What is claimed is:

1. A portable speech communication apparatus, comprising;

an apparatus housing;

a microphone in the apparatus housing; and a flip having at least one speech opening, a base portion swingably mounted to the apparatus housing and having a substantially even inner surface, and a plate-shaped insert means having a recess and being attached by adhesion to the inner surface of the base portion, thereby forming an internal sound channel in the flip between the at least one speech opening and the microphone.

2. The apparatus of claim 1, wherein the plate-shaped insert means includes a first adhesive tape layer having a cut-out channel for forming the recess in a longitudinal extension of the tape, the cut-out channel being connected at a first end to the at least one speech opening and at a second end to the microphone or to a point in a vicinity thereof, and a second plate layer covering the first adhesive tape layer and having the at least one speech opening.

3. The apparatus of claim 2, wherein the cut-out channel has a triangular shape and at least one side is bent to provide acoustical properties for guiding speech.

4. A swingable flip for a portable radiotelephone, comprising:

a hollow sound channel internal to the flip for guiding speech from a first end of the flip to a second end, at which a microphone of the radiotelephone is arranged;

a base portion having a substantially even inner surface and a plate-shaped insert means having a recess and being adapted to be attached by adhesion to the inner surface of the base portion;

wherein the sound channel is formed by the recess in the plate-shaped insert means.

5. The swingable flip of claim 4, wherein the plate-shaped insert means comprises an adhesive tape and the sound channel is formed by a two-dimensional shape cut out from the adhesive tape.

\* \* \* \* \*